US008875239B2

(12) United States Patent
Chow et al.

(10) Patent No.: US 8,875,239 B2
(45) Date of Patent: *Oct. 28, 2014

(54) COGNITIVE PATTERN RECOGNITION FOR SECURITY ACCESS IN A FLOW OF TASKS

(75) Inventors: Stephen Y. Chow, Dallas, TX (US); Grant D. Miller, Arvada, CO (US); Nader M. Nassar, Yorktown Heights, NY (US); Richard J. Newhook, West Chester, PA (US); Erich D. Walls, Valparaiso, IN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/206,949

(22) Filed: Aug. 10, 2011

(65) Prior Publication Data

US 2013/0042303 A1    Feb. 14, 2013

(51) Int. Cl.
*G06F 21/00* (2013.01)
*G06F 21/36* (2013.01)

(52) U.S. Cl.
CPC .................................. *G06F 21/36* (2013.01)
USPC .................... 726/3; 726/22; 726/23; 434/362

(58) Field of Classification Search
CPC .......................... G06F 21/36; G06F 2221/2133
USPC ........................................................... 726/3
See application file for complete search history.

(56) References Cited

U.S. PATENT DOCUMENTS

| 7,841,940 | B2 | 11/2010 | Bronstein |
| 7,891,005 | B1 | 2/2011 | Baluja et al. |
| 8,296,659 | B1 * | 10/2012 | Antypas, III ................. 715/741 |
| 2005/0114705 | A1 | 5/2005 | Reshef et al. |
| 2007/0124595 | A1 | 5/2007 | Carter et al. |
| 2008/0066014 | A1 | 3/2008 | Misra |
| 2008/0209217 | A1 | 8/2008 | Lamberton et al. |
| 2008/0216163 | A1 | 9/2008 | Pratte et al. |
| 2009/0077629 | A1 | 3/2009 | Douceur et al. |
| 2009/0077653 | A1 | 3/2009 | Osborn et al. |
| 2009/0138723 | A1 | 5/2009 | Nyang et al. |
| 2009/0313694 | A1 | 12/2009 | Mates |
| 2010/0095350 | A1 * | 4/2010 | Lazar et al. ....................... 726/3 |
| 2010/0162357 | A1 * | 6/2010 | Chickering et al. .............. 726/3 |
| 2010/0228804 | A1 | 9/2010 | Dasgupta et al. |
| 2010/0318669 | A1 | 12/2010 | Chugh |

(Continued)

OTHER PUBLICATIONS

Nassar et al., "Methods for Restricting Access in a Web Application", 2012, 6 pgs.*

(Continued)

*Primary Examiner* — David Pearson
*Assistant Examiner* — Thaddeus Plecha
(74) *Attorney, Agent, or Firm* — Cantor Colburn LLP

(57) ABSTRACT

Implementing security access includes receiving a request to perform an activity over a network and administering a cognitive test responsive to the request. The administering includes randomly selecting a set of related images from a database of images, randomly selecting one image that is unrelated to the set of related images, displaying the set of related images along with the image that is unrelated to the set of related images, and prompting a user to identify the image that is unrelated to the set of related images. Implementing the security access also includes processing results of the cognitive test, and executing the activity when it is determined from the processing that the cognitive test has been successfully completed.

20 Claims, 3 Drawing Sheets

(56) References Cited

U.S. PATENT DOCUMENTS

| | | | |
|---|---|---|---|
| 2010/0325706 A1* | 12/2010 | Hachey | 726/6 |
| 2011/0072498 A1 | 3/2011 | Li et al. | |
| 2011/0081640 A1* | 4/2011 | Tseng et al. | 434/362 |
| 2011/0150267 A1* | 6/2011 | Snelling et al. | 382/100 |
| 2012/0084450 A1 | 4/2012 | Nagamati et al. | |
| 2012/0167204 A1* | 6/2012 | Akka | 726/22 |

OTHER PUBLICATIONS

Ahn, L. et al. (Feb. 2004). Telling humans and computer apart automatically. Communications of the ACM, 47(2), 57-60.

IBM (Oct. 2009). A New Method for Telling Humans and Computers Apart Automatically. IP.com number: IPCOM000188716D. pp. 1-6.

IBM (Jul. 2009). Method and system to generate human knowledge based CAPTCHA. IP.com No. IPCOM000184977D. pp. 1-6.

Chew, M. et al. (2004). Image recognition CAPTCHAs. In Proceedings of the Information Security, Conference (ISC 2004), LNCS 3225, 268-279.

Elson, J. et al. (Oct.-Nov. 2007). Asirra: A CAPTCHA that Exploits Interest-Aligned Manual Image Categorization. ACM, CCS'07, pp. 1-9.

Final Office Action for U.S. Appl. No. 13/206,934, mailed Sep. 12, 2013, 15 pages.

Non Final Office Action for U.S. Appl. No. 13/206,934, mailed Apr. 25, 2013, 17 pages.

Notice of Allowance for U.S. Appl. No. 13/206,934, mailed Mar. 17, 2014, 11 pages.

* cited by examiner

COGNITIVE PATTERN RECOGNITION FOR SECURITY ACCESS IN A FLOW OF TASKS

BACKGROUND

The present invention relates to computer-based security access, and more specifically, to cognitive pattern recognition for security access in a flow of tasks.

Consumers seeking to perform transactions, such as the purchase of items via electronic commerce (ecommerce) applications that include check out processes oftentimes find themselves at a significant disadvantage over competing interests in these items. For example, it is becoming more commonplace for traders to procure large quantities of popular consumer items for the purpose of resale to these consumers by accessing the ecommerce applications using automated software techniques (e.g., pre-formatted scripts or bots) that place orders for the items. As these software techniques operate at very high speeds, they are able to outpace the capabilities of any interested individuals to procure these items, thereby placing these individuals at a great disadvantage.

Many enterprises have adopted security software tools in an attempt to thwart these automated software systems. One popular technique utilizes visually distorted words or alphanumeric characters that are presented to a user and the user is required to enter them in a special field. The distortion seeks to prevent the automated software systems from identifying the words using character recognition technology, thereby discouraging the automated software practices. However, this type of security can be difficult for the consumer as well, since the distortions sometimes have the effect of preventing recognition of the characters even to a human eye. In addition, individuals who are visually impaired would have a particular disadvantage. Furthermore, anti-security techniques for identifying distorted characters have become more improved over time and are able to achieve greater success rates than ever before.

SUMMARY

According to one embodiment of the present invention, a method for implementing security access is provided. The method includes receiving a request to perform an activity over a network, administering a cognitive test responsive to the request. The administering includes randomly selecting a set of related images from a database of images, randomly selecting one image is that unrelated to the set of related images, displaying the set of related images along with the image that is unrelated to the set of related images, and prompting a user to identify the image that is unrelated to the set of related images. The method also includes processing results of the cognitive test, and executing the activity when it is determined from the processing that the cognitive test has been successfully completed.

According to another embodiment of the present invention, a system for implementing security access is provided. The system includes a computer processor and a security application executable by the computer processor. The security application implements a method. The method includes receiving a request to perform an activity over a network, administering a cognitive test responsive to the request. The administering includes randomly selecting a set of related images from a database of images, randomly selecting one image is that unrelated to the set of related images, displaying the set of related images along with the image that is unrelated to the set of related images, and prompting a user to identify the image that is unrelated to the set of related images. The method also includes processing results of the cognitive test, and executing the activity when it is determined from the processing that the cognitive test has been successfully completed.

According to a further embodiment of the present invention, a computer program product for implementing security access is provided. The computer program product includes a storage medium having instructions embodied thereon, which when executed by a computer, cause the computer to implement a method. The method includes receiving a request to perform an activity over a network, administering a cognitive test responsive to the request. The administering includes randomly selecting a set of related images from a database of images, randomly selecting one image is that unrelated to the set of related images, displaying the set of related images along with the image that is unrelated to the set of related images, and prompting a user to identify the image that is unrelated to the set of related images. The method also includes processing results of the cognitive test, and executing the activity when it is determined from the processing that the cognitive test has been successfully completed.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

According to an exemplary embodiment, computer-based security access processes are provided. The security access processes provide a cognitive test over a network to ensure that responses entered are generated by a human as opposed to an automated software application. In receiving a correct answer to the cognitive test, the security access processes presumes that the response has been entered by a human.

The security access processes provide a way of discriminating human involvement in a computer-based transaction that utilizes Internet or network-connected interactions that require an endurance of actual human intervention and not a "pseudo intervention" that could be performed by an automated system or application in the realm of computer technology. Cognitive perception and reaction are performed by the human end user to verify that a human is actually interacting with the information technology system and to verify the intentions of the user initiating the transaction.

In addition, the security access processes may be configured to identify methodical queries of a page for access and deny or block that instance from access to the system (e.g., via the incoming IP address, user name, etc.). These, and other features, of the security access processes will now be described.

Figure 1:
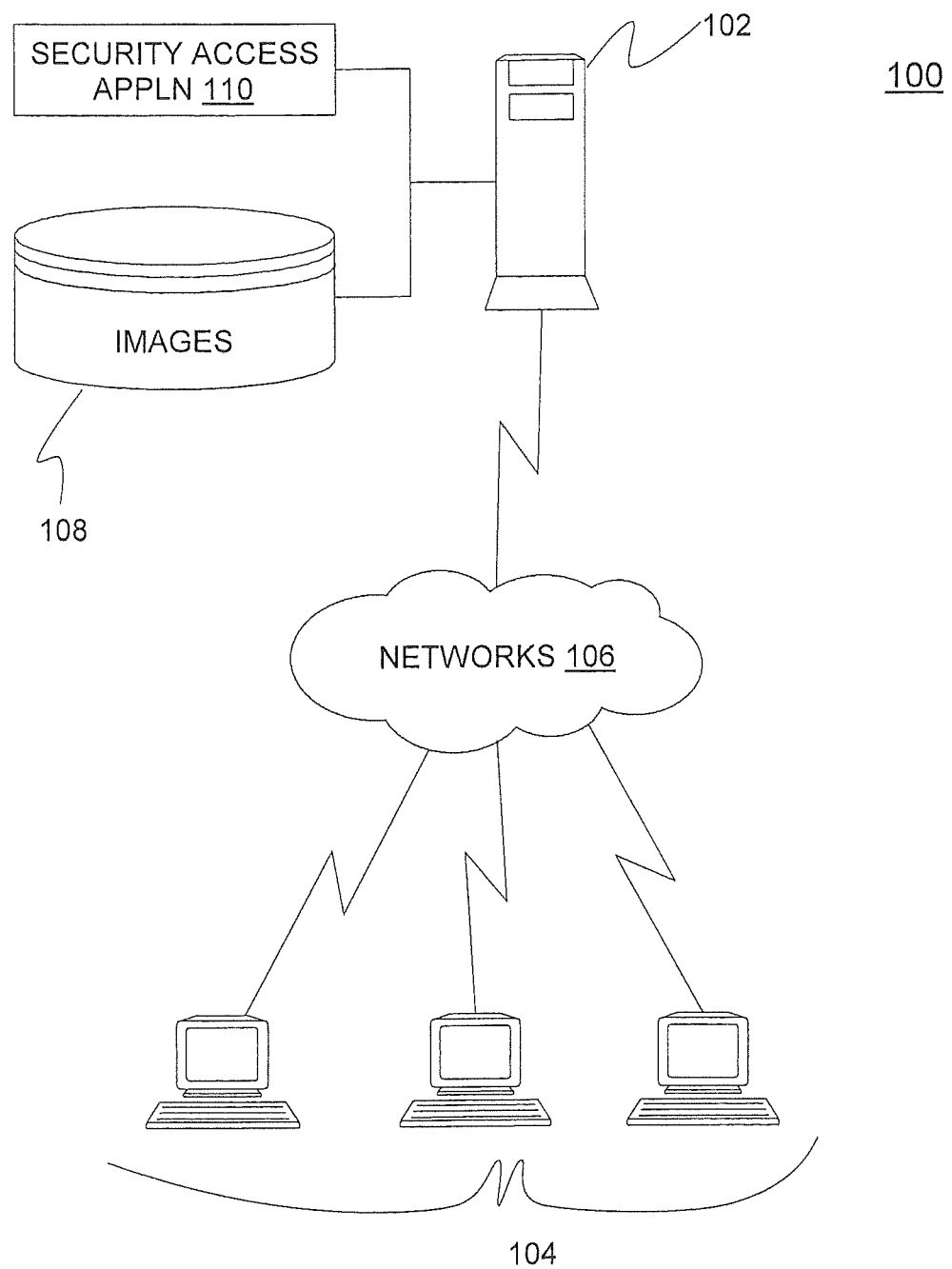
FIG. 1 depicts a block diagram of a system upon which security access may be implemented according to an embodiment of the present invention.

Turning now to FIG. 1, a system upon which the security access processes may be implemented will now be described in an exemplary embodiment. The system 100 of FIG. 1 includes a host system 102 and one or more user systems 104 through which users at one or more geographic locations may contact the host system 102. The host system 102 executes computer instructions for implementing the exemplary security access processes described herein. In one embodiment, the host system 102 represents an enterprise that performs transactions on behalf of users who desire goods or services from the enterprise system. The host system 102 may provide a web site including web pages that offer information regarding goods and/or services, as well as the ability to acquire these goods and services.

The user systems 104 are coupled to the host system 102 via one or more networks 106. Each user system 104 may be implemented using a general-purpose computer executing a computer program for carrying out processes described herein. For example, the user systems 104 may each implement a web browser application. The user systems 104 may be personal computers (e.g., a lap top, a personal digital assistant) or a network server-attached terminal. In an embodiment, the user systems 104 are operated by consumers of goods or services offered via the host system 102.

The networks 106 may include any type of known networks including, but not limited to, a wide area network (WAN), a local area network (LAN), a global network (e.g. Internet), a virtual private network (VPN), and an intranet. The networks 106 may be implemented using a wireless network or any kind of physical network implementation known in the art. A user system 104 may be coupled to the host system through multiple networks (e.g., intranet and Internet) so that not all user systems 104 are coupled to the host system 102 through the same network. One or more of the user systems 104 and the host system 102 may be connected to the networks 106 in a wireless fashion.

The host system 102 is communicatively coupled to a storage device 108. The storage device 108 stores data relating to the security access processes and may be implemented using a variety of devices for storing electronic information. In an exemplary embodiment, the storage device 108 stores images used in providing the security access processes as will be described herein. It is understood that the storage device 108 may be implemented using memory contained in the host system 102 or it may be a separate physical device. The storage device 108 may be logically addressable as a consolidated data source across a distributed environment that includes networks 106. Information stored in the storage device 108 may be retrieved and manipulated via the host system 102.

In an embodiment, the host system 102 operates as a database server and coordinates access to application data including data (e.g., images) stored on the storage device 108.

The host system 102 depicted in FIG. 1 may be implemented using one or more servers operating in response to a computer program stored in a storage medium accessible by the server. The host system 102 may operate as a network server (e.g., a web server) to communicate with the user systems 104. The host system 102 handles sending and receiving information to and from the user systems 104 and can perform associated tasks.

The host system 102 may also operate as an application server. The host system 102 executes one or more computer programs to implement the security access processes. As shown in FIG. 1, the host system 102 these computer program(s) are implemented by a security access application 110.

Figure 2:
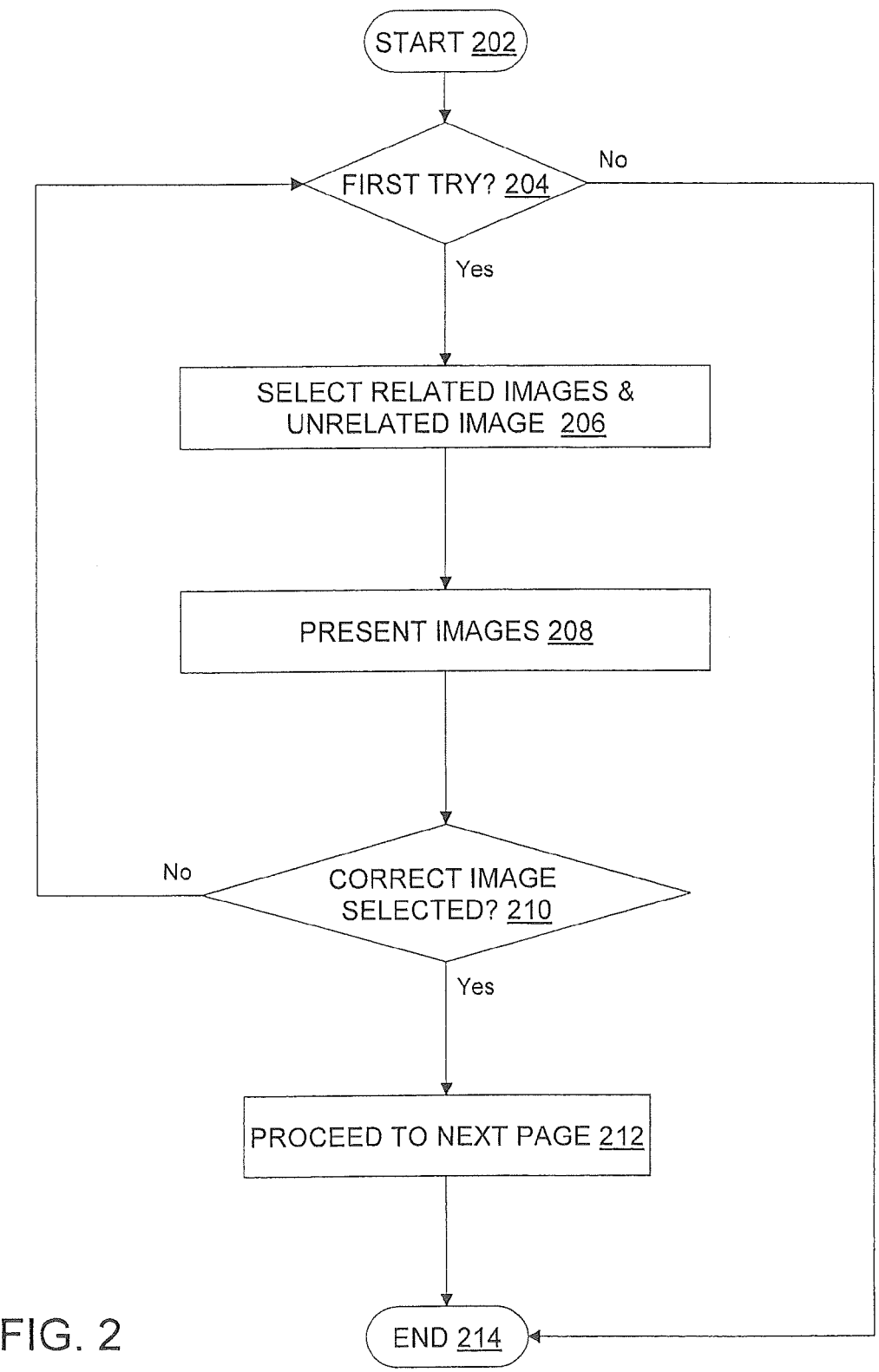
FIG. 2 depicts a flow diagram describing a process for implementing security access according to an embodiment of the present invention.

As indicated above, the security access processes provide a cognitive test over a network to ensure that responses entered are generated by a human as opposed to an automated software application. In receiving a correct answer to the cognitive test, the security access processes presumes that the response has been entered by a human. Turning now to FIG. 2, a process for implementing the security access will now be described in an exemplary embodiment.

The process begins at step 202 whereby a request is received at the host system 102 to perform an activity or transaction. In an embodiment, the request relates to a desire to purchase or order goods or services offered by an enterprise of the host system 102. For example, a user may be browsing a web site of the host system 102 enterprise and select goods or services to include, e.g., in a shopping cart at the site or to proceed to a checkout web page. When the user selects an option to perform the transaction (e.g., to purchase or order the goods/services), the security access application 110 receives the request and proceeds as described herein. Other transactions may include performing a sensitive activity, such as accessing personal or confidential records, downloading software, or registering with an entity for access to information or membership functions.

At step 204, the security access application 110 determines whether the user system 102 has previously attempted to implement a cognitive test at the web site that has been prepared by the security access application 110. If the number of unsuccessful attempts meets a pre-defined threshold number of attempts (e.g., more than once as shown in FIG. 2), the security access application 110 presumes that the source of the requests is an automated software system and may handle the request according to prescribed business logic. In one embodiment, the system may deny the request. The process then ends at step 214.

Otherwise, if the number of unsuccessful attempts does not meet the pre-defined threshold, the security access application 110 administers a cognitive test to the requester at step 206. The security access application 100 accesses the storage device 108 and randomly selects a number of related images from a database and one image that is unrelated to the related images. The related images refer to those that have some common aspects or are associated with some human-recognizable taxonomy. For example, taxonomies may include animals, transport systems, symbols, or variations of a common subject, to name a few. The images may be related in the storage device by assigning tags to the images specifying a relationship (or lack of relationship). An unrelated image refers to one that does not share common attributes with another image. The images may be any representations that are identifiable by a human. The storage device 108 may be configured to store the images using any classification scheme that enables the security access application 110 to identify image relationships. The image selections may be made at run time (e.g., at the time the request is received).

At step 208, the security access application 110 displays the images (related and unrelated) on a display screen of the user system 104, along with a prompt to select the unrelated image.

Figure 3A:
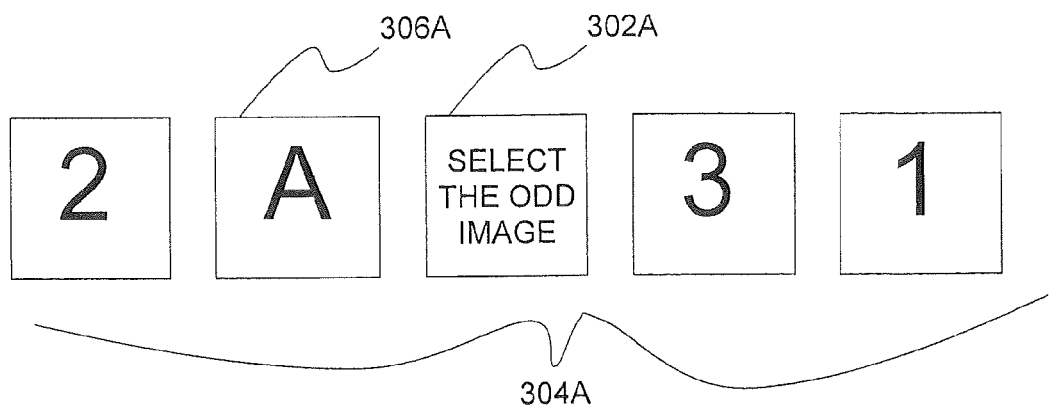
FIG. 3 depicts a user interface screen and sample data provided by the security access system according to an embodiment of the present invention.
Figure 3B:
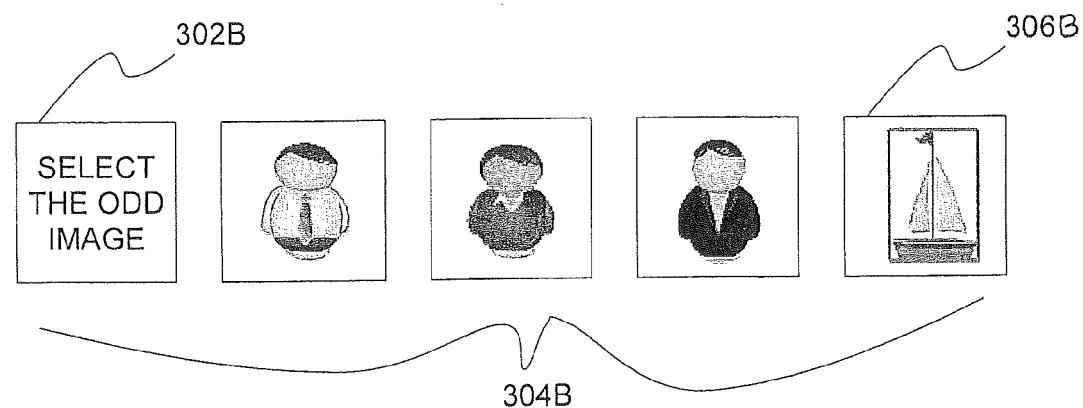

A user interface screen is shown in FIG. 3A and 3B with sample data. As shown in FIG. 3A, e.g., an instruction image 302A is displayed that directs the user to select the unrelated image (also referred to as "odd image") in a sequence of images 304A. The unrelated image 306A in this example is the letter "A", as the remaining images represent numerals. As shown in FIG. 3B, e.g., an instruction image 302B is displayed that directs the user to select the unrelated image in a sequence of images 304B. The unrelated image in this example is the boat 306B. In an exemplary embodiment, as shown in FIGS. 3A and 3B, the instruction images 302A and 302B are inline with, and are the same size as, the other images 304A and 304B (including the unrelated images 306A and 306B), respectively, in the sets. This alignment and common sizing of the images may assist in preventing automated systems, such as spiders, from learning that images of certain sizes or pixel numbers could be associated with specific items, such as the question image, thereby processing the images differently. The instruction image, unrelated image, and the other images may be aligned along a common axis (e.g., horizontally or vertically).

At step 210, the security access application 110 determines if the user has selected the correct (i.e., unrelated) image. If not, the user may be instructed to repeat the cognitive test as long as a pre-defined number of attempts have not been reached (step 204) whereby the security access application 110 accesses new images for display. In this scenario, the security access application 110 may present an error message to the user. If the correct image has been selected at step 210, the security access application 110 presumes that the requester is a human and permits the user to proceed to the next web page at step 212 (e.g., the shopping cart or checkout page). The process then ends at step 214.

As indicated above, the security access application 110 may be configured to associate an audio file with each of the images in the database in order to provide greater accessibility to users who may be visually impaired. In this embodiment, the user may select an option that is associated with the image on the display and the assigned tag is mapped to the audio file and causes the security access application 110 to retrieve the corresponding audio file and present the audio file to the user. In this manner, the user is provided with audio information representing the image such that the user can identify the image by the audio. Once the user has listened to each audio file presented on the display, the user can then cognitively determine which of the images are unrelated by its corresponding audio file.

Technical effects of the invention include security access processes that provide a cognitive test over a network to ensure that responses entered are generated by a human as opposed to an automated software application. The security access processes select related images and an unrelated image from a repository, and present the related images and the unrelated image to a user in response to an activity performed over a network. In receiving a correct answer to the cognitive test, the security access processes presumes that the response has been entered by a human.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for implementing security access, the method comprising:
    receiving a request to perform an activity over a network;
    administering a cognitive test responsive to the request, comprising:
    randomly selecting a set of related images from a database of images;
    randomly selecting one image that is unrelated to the set of related images;
    serially displaying, in a same row along a single common axis, the set of related images, the image that is unrelated to the set of related images, and an instruction image, the serially displaying including randomly assigning a placement of the set of related images, the image that is unrelated, and the instruction image on the single common axis in a row;
    prompting a user, via the instruction image, to select the image that is unrelated to the set of related images;
    processing results of the cognitive test; and
    executing the activity when it is determined from the processing that the cognitive test has been successfully completed,
    wherein the instruction image only contains instructions for the user to select the image that is unrelated to the set of related images.

2. The method of claim 1, wherein the cognitive test is successfully completed when the image that is unrelated to the related set of images is selected by the user.

3. The method of claim 2, wherein the image that is unrelated to the related set of images is selected by the user before a predefined number of attempts to gain access to a web page has been met.

4. The method of claim 1, wherein the activity subject to the request is a transaction.

5. The method of claim 1, further comprising associating tags with each of the images in the database, each of the tags discriminating related images from unrelated images in the database.

6. The method of claim 5, further comprising associating an audio file with each of the tags, and presenting the audio file when the user selects an image having a tag corresponding to the audio file, the audio file audibly identifying the image.

7. The method of claim 1, wherein administering the cognitive test includes configuring the set of related images and the unrelated image to be the same size.

8. The method of claim 7, wherein administering the cognitive test further includes configuring the instruction image to be the same size as the set of related images and the unrelated image.

9. A system for implementing security access, the system comprising:
    a hardware computer processor; and
    a security access application executable by the hardware computer processor, the security access application configured to implement a method, the method comprising:
    receiving a request to perform an activity over a network;

administering a cognitive test responsive to the request, comprising:

randomly selecting a set of related images from a database of images;

randomly selecting one image that is unrelated to the set of related images;

serially displaying, in a same row along a single common axis, the set of related images, the image that is unrelated to the set of related images, and an instruction image, the serially displaying including randomly assigning a placement of the set of related images, the image that is unrelated, and the instruction image on the single common axis in the row; and prompting a user, via the instruction image, to select the image that is unrelated to the set of related images;

processing results of the cognitive test; and executing the activity when it is determined from the processing that the cognitive test has been successfully completed, wherein the instruction image only contains instructions for the user to select the image that is unrelated to the set of related images.

10. The system of claim 9, wherein the cognitive test is successfully completed when the image that is unrelated to the related set of images is selected by the user.

11. The system of claim 10, wherein the image that is unrelated to the related set of images is selected by the user before a predefined number of attempts to gain access to a web page has been met.

12. The system of claim 9, wherein the activity subject to the request is a transaction.

13. The system of claim 9, wherein the security access application is further configured for associating tags with each of the images in the database, each of the tags discriminating related images from unrelated images in the database.

14. The system of claim 13, wherein the security access application is further configured for associating an audio file with each of the tags, and presenting the audio file when the user selects an image having a tag corresponding to the audio file, the audio file audibly identifying the image.

15. The system of claim 9, wherein administering the cognitive test includes configuring the set of related images and the unrelated image to be the same size.

16. A computer program product for implementing security access, the computer program product comprising a non-transitory storage medium embodied with instructions, which when executed by a computer cause the computer to implement a method, the method comprising:

receiving a request to perform an activity over a network;

administering a cognitive test responsive to the request, comprising:

randomly selecting a set of related images from a database of images;

randomly selecting one image that is unrelated to the set of related images;

serially displaying, in a same row along a single common axis, the set of related images, the image that is unrelated to the set of related images, and an instruction image, the serially displaying including randomly assigning a placement of the set of related images, the image that is unrelated, and the instruction image on the single common axis in the row; and prompting a user, via the instruction image, to select the image that is unrelated to the set of related images;

processing results of the cognitive test; and executing the activity when it is determined from the processing that the cognitive test has been successfully completed, wherein the instruction image only contains instructions for the user to select the image that is unrelated to the set of related images.

17. The computer program product of claim 16, wherein the cognitive test is successfully completed when the image that is unrelated to the related set of images is selected by the user.

18. The computer program product of claim 17, wherein the image that is unrelated to the related set of images is selected by the user before a predefined number of attempts to gain access to a web page has been met.

19. The computer program product of claim 16, wherein the activity subject to the request is a transaction.

20. The computer program product of claim 16, further comprising instructions for associating tags with each of the images in the database, each of the tags discriminating related images from unrelated images in the database.

* * * * *